Patented Nov. 28, 1950

2,531,926

UNITED STATES PATENT OFFICE 2,531,926

PRODUCTION OF TITANIUM DIOXIDE PIGMENT FROM HIGH TITANIUM DIOXIDE CONTENT SLAGS

Seldon P. Todd, Amherst, Myron L. Myers, Lynchburg, and Winfred J. Cauwenberg, Piney River, Va., assignors to American Cyanamid Company, New York, N. Y., a corporation of Maine No Drawing. Application February 15, 1949, Serial No. 76,662

7 Claims. (Cl. 23—202)

The present invention relates to the recovery of titanium dioxide from titanium-bearing slags, and relates more particularly to the preparation of titanium dioxide pigment from slags containing from about 65% to 90% or more of $TiO_2$ and from about 1% to about 16% of iron compounds.

Recently, there have become available to the art titanium slags containing from about 65% to about 90% or more of titanium dioxide, from about 1% to about 16% of iron compounds, and from about 8% to about 20% of oxides of the basic fluxing agents employed in producing the titanium slags. These high titanium content slags are ordinarily produced by smelting titaniferous iron ores such as, for example, ilmenite under reducing conditions in the presence of basic fluxing agents whereby the major proportion of iron oxide contained in the ore is reduced to metallic iron and is separated in molten condition. The basic fluxing agents employed are ordinarily calcium oxide, magnesium oxide and aluminum oxide, and these fluxing agents are employed in quantities which produce fluid slags from which the molten iron may be removed by gravity separation. The slags obtained usually contain from about 65 to about 90% or more of $TiO_2$, 1–16% of iron expressed as $FeO$, 0.1–15% $CaO$, 1.0–7.3% $MgO$, 1.5–11% $Al_2O_3$ and 1.75–10.5% $SiO_2$. The slags ordinarily also contain small amounts, on the order of about 0.25–1.1% $MnO$, 0.04–0.2% $Cr_2O_3$, 0.2–0.6% of $V_2O_5$, and 0.0–0.1% of $P_2O_5$.

However, the general knowledge of the art is not applicable in the recovery of titanium dioxide pigment from the above described slags. The problems encountered stem in part from the fact that these slags are much less reactive with sulfuric acid than are raw titaniferous iron ores which the art has employed and for this reason it is difficult to convert the titanium content thereof to soluble sulfate form. Furthermore, since the other constituents of the slags, such as the residues of the basic fluxing agents and other contaminants are different from the contaminants present in raw ores, the problems involved in their removal also differ from those encountered in the presently employed commercial methods of preparing titanium dioxide pigments. Another problem encountered in the use of slags containing large quantities of titanium dioxide is that of controlling the amount of titanous titanium contained therein since this form of titanium is not readily hydrolyzed according to previously accepted thermal hydrolysis methods.

We have found that by following the hereinafter described procedure the difficulties normally encountered in recovering titanium dioxide from the above described titanium slags are overcome and that commercially acceptable titanium dioxide pigment may be produced therefrom.

The primary advantage to be derived from the present invention resides in the fact that inasmuch as the slags employed contain a relatively large proportion of $TiO_2$ and a correspondingly low quantity of iron and other acid consuming constituents, we are enabled to greatly increase the yield of titanium dioxide for a given quantity of sulfuric acid over the yields now obtained by the commercially employed sulfuric acid digestion of raw titaniferous ores.

Other advantages of the present invention reside in procedural economies which will become apparent from the following detailed description of the invention.

Digestion of the slag

As stated above, a primary problem encountered in the recovery of titanium dioxide from slags containing in excess of about 65% of $TiO_2$ results from the fact that such slags are relatively unreactive with sulfuric acid. For this reason it has been found necessary to comminute the slags to relatively fine particle size in order that a greater surface area may be presented to the acid. It is also necessary to apply heat in order to initiate the reaction between the ground slag and sulfuric acid. However, where the slag is reduced to exceptionally small particles and is then digested with hot concentrated sulfuric acid, the reaction proceeds with explosive violence and is too dangerous for commercial operations. On the other hand, if the slag particles are relatively coarse, the reaction is very sluggish and the yield of $TiO_2$ is uneconomical.

We have discovered that the digestion reaction may be controlled within safe operating limits while not sacrificing recovery of $TiO_2$ by carefully controlling the particle size distribution of the slag. According to our novel method, a slag containing about 65% to 90% of $TiO_2$ is comminuted to a degree such that all of the particles will pass through a screen having 200 meshes per linear inch, i. e. the particles will have an average diameter of not more than 74 microns. However, in ordinary grinding procedures material ground to pass through a 200 mesh screen may contain as much as about 40% of particles having an average diameter of less than about 10 microns. This exceptionally finely ground slag is the direct cause of the violent digestion reactions which it is one of the purposes of the present invention to avoid. We have found that the grinding treatment should be controlled so that not more than about 25–30% of the comminuted material will have an average diameter smaller than about 8–10 microns. We have further found that the most desirable digestion reaction occurs when at least 90% or more of the ground slag is smaller than 44 microns in average diameter, i. e. 325 mesh. A high $TiO_2$ content slag which has been ground to the foregoing specifications will react in a uniform manner with concentrated sulfuric acid and will result in the recovery of substantially all of the $TiO_2$ contained therein.

In carrying out the sulfuric acid digestion of the ground slag, the optimum reaction rate occurs when the acid has reached a concentration of approximately 85%. Since the concentration of the sulfuric acid will drop as the reaction proceeds, the best results are obtained when the starting acid concentration is in excess of 90%. For example, we have found that in some instances good yields are obtained where 92% sulfuric acid is employed, while in other instances optimum yields have been obtained with 95–98% sulfuric acid. The differences existing in the yield of titanium dioxide are due to variations in the slag itself, in the particle size distribution obtained upon comminution of the slag, and in the dilution of the sulfuric acid during the heat treatment prior to initiation of the reaction. However, we have discovered that where the slag is first ground according to the hereinbefore described method satisfactory recovery of $TiO_2$ from slags containing in excess of 65% of $TiO_2$ may be obtained by carrying out the digestion with sulfuric acid having a concentration within the range of from about 85% to about 98%. For most practical purposes, the best results will be obtained when the initial acid concentration is within the range of from 90% to 98%, and this is particularly true when the preheating of the digestion components is carried out by means of steam injection.

Accordingly, our preferred method of digesting slags containing in excess of 65% of $TiO_2$ consists essentially in first comminuting the slag to a particle size distribution such that at least 90% thereof is smaller than 44 microns in average diameter and not more than about 30% thereof is smaller than 8–10 microns in average diameter. Thereafter the ground slag is mixed with sulfuric acid having a concentration of from 85% to 98%. The digestion mixture is then heated, either directly or by the injection of steam or other heated gas to initiate reaction between the acid and the slag. Ordinarily the temperature will rise to about 160° C. to about 190° C. before any visible reaction takes place. At this point the external heating may be discontinued and the reaction will continue to substantial completion exothermally. In digesting relatively small batches of slag it may be necessary, in some instances, to apply heat during the later stages of the reaction in order to insure completion thereof. However, in commercial digestion operations the heat of reaction is sufficient to carry the reaction to completion. When the conditions above described are closely followed the digestion reaction will proceed uniformly and without violence and will result in the recovery of from 85% to about 95% or more of the titanium dioxide contained in the slag.

*Clarification of digestion liquor*

The product of the acid digestion is ordinarily a cake varying in porosity according to the manner in which the digestion was carried out. In this respect, the presence of a small amount of finely divided carbon distributed uniformly throughout the digestion mass results in a more uniform reaction and in the production of a more porous digestion cake. The addition of finely divided carbon to the digestion mixture also results in further advantages by providing a method of controlling the quantity of reduced titanium in the digestion production and this discovery and the attendant advantages are described and claimed in the copending application Serial No. 76,663 to Todd et al., filed on even date herewith.

The digestion cake is blown with air to effect cooling thereof and water is then passed into the cake while the air blowing is continued for a period of time sufficient to dissolve substantially all of the digested titanium present in the cake. Sufficient water is thereafter added to produce a slurry having a specific gravity of from about 1.47 to about 1.55. It has been found that if the specific gravity of the slurry exceeds this upper limit it is too viscous to permit easy filtration. Furthermore, the addition of water should be regulated to avoid temperatures above about 75° C. to insure that no premature hydrolysis of the titanium sulfate will take place. Ordinarily all of the soluble material will have been dissolved within a period of from about 1 to 4 hours, but in some instances it may be necessary to agitate the slurry for periods ranging up to 16–18 hours in order to insure that all of the titanium sulfate and the other soluble sulfates have entered into solution.

Another feature of the present invention resides in the discovery that the clarification of this aqueous slurry, to obtain a clear liquid suitable for hydrolysis to produce pure titanium dioxide hydrolysate, may be carried out in one operation. The experience of the art in the production of titanium dioxide pigment from raw ilmenite has shown that the clarification of the digestion liquor must be carried out in a two stage treatment. This has been attributed to the presence in the liquor of colloidal micaceous compounds which are not susceptible of removal in a single operation. However, we have discovered that the silicates present in the titanium-containing slags described above may be removed from the aqueous slurry in a single clarification treatment along with other insoluble constituents. The ease of removal of the silicates is believed to be due to the fact that they are fused during the ore smelting procedure and their colloidal nature thus destroyed. In addition, however, there are also present in these slags from about 4–5% to about 25–30% of flux residues. Since the fluxing agents, as above stated, are usually basic alkaline earth metal compounds, their residues may be in the form of oxides, silicates, etc. These compounds are probably converted to their corresponding sulfates during the slag digestion treatment, and it is believed that they aid materially in the filtration of our digestion liquors. Since the calcium of the slag forms calcium sulfate which is practically insoluble in the solution, it will be seen that it may act as a filter aid and thus facilitate clarification of our digestion liquors.

The aqueous slurry above described is clarified by the addition thereto of small amounts of animal glue and by the coindicental addition of small amounts of antimony oxide in an aqueous sodium sulfide solution. The slurry is allowed to stand until the insoluble materials have been flocculated and is thereafter filtered to provide a clarified liquor having a specific gravity of not more than about 1.5 and usually about 1.4 to 1.5 which is particularly well suited for treatment by commercially employed thermal hydrolysis methods to produce hydrous titanium dioxide. Thus we have, by our single-stage clarification treatment, eliminated the necessity of resorting to a costly and lengthy multiple-stage clarification and filtration treatment in the use of the above-described digestion cakes. The discovery is additionally important because it permits the process to be carried out as a continuous operation.

We have found that satisfactory results are obtained when from about 0.03% to about 0.06% of animal glue is added to the slurry based on the weight of the slurry. The soluble heavy metal salts contained in the slurry are removed by the addition of a soluble sulfide. From about 0.004% to about 0.01% of antimony oxide based on the weight of the slurry is added to a 10% aqueous solution of sodium sulfide and this solution is added to the digestion slurry so that the antimony is present therein as the flocculent sulfide. This antimony sulfide floc gathers up other fine insoluble particles in such form that they can be filtered out thus effecting clarification of the liquor. The clarified liquor so obtained will ordinarily not contain in excess of about 0.05% of soluble silicates based on the $TiO_2$ in the liquor and this small amount does not deleteriously affect the color or other physical characteristics of the final titanium dioxide pigment.

The clarified liquor may be thermally hydrolyzed according to any of the well-known commercial methods now employed by the art in treating titanium sulfate liquors. However, the liquor obtained according to our novel method ordinarily contains much less ferrous sulfate than do the liquors obtained from sulfuric acid digestion of raw ilmenite, since the major proportion of the iron has been removed during the smelting of the titaniferous ore. For this reason our clarified digestion liquor will ordinarily contain from about 9.5% to about 15.5% or more of titanium expressed as $TiO_2$. We have found that where our digestion liquors contain more than about 13% of $TiO_2$ the hydrolysis treatment may be carried out directly without the necessity of first resorting to an evaporation treatment to raise the $TiO_2$ content of the liquor. However, when thermal hydrolysis of the liquor is to be carried out directly, we have found that best results are obtained when a separately prepared nucleating agent is employed. In any event, the clarified liquor is thereafter heated to boiling and is maintained at a boil until at least about 70%, and usually from 80% to 90% or more of the titanium has precipitated in the form of hydrous titanium dioxide. This hydrolysate is then calcined to either the anatase or rutile crystal modification of titanium dioxide by any known or approved procedure. The pigment obtained is entirely comparable with the best titanium dioxide pigments currently produced by the pigment industry.

In a specific embodiment of the invention, slag which has been produced by smelting ilmenite employing limestone as the basic fluxing agent and in which a reducing atmosphere was obtained by the use of carbon in the furnace charge was analyzed in order to determine the amount of sulfuric acid necessary to react with all of the basic components exclusive of the $TiO_2$ and necessary to satisfy about 70% of the stoichiometric requirement of the $TiO_2$ to form $Ti(SO_4)_2$. It has been found that the most practical commercial digestion of titanium-containing slags is obtained when the reaction is carried out under conditions affording a basicity factor of from about 10 to about 30. The term "basicity" as it is employed in this description will be understood to represent the deficiency of sulfuric acid employed as compared to the amount of acid which should be present theoretically with titanium to produce titanic sulfate $Ti(SO_4)_2$. The slag employed contained 67.1% of $TiO_2$, 11.2% of iron expressed as FeO, 8.2% of CaO, 5.0% of MgO, 4.6% of $Al_2O_3$, 3.4% of $SiO_2$, and the remainder of metal oxides such as $Cr_2O_3$, $V_2O_5$, MnO, and $P_2O_5$. The estimated quantity of sulfuric acid was 1.57 parts of 100% $H_2SO_4$ for each part of slag.

The slag was ground to a particle size distribution whereby all of the material passed through a 200 mesh screen, 75.8% thereof was greater than 10 microns diameter and 54.4% was greater than 20 microns diameter. The required amount of 98% sulfuric acid was run into a commercial digester and heated to 50–60° C. The ground slag was gradually added to the heated acid while the mixture was continually stirred to insure thorough wetting of the individual particles of slag. The mixture was heated by admitting steam thereinto until a temperature of about 180° C. was attained, at which point a vigorous reaction was visible and addition of heat was discontinued. After a reaction period of about 4 hours, during which time the temperature reached a maximum of about 215° C., air was blown through the digestion cake. Water was then run into the digestor, care being taken to avoid a temperature in excess of 75° C. The slurry was agitated with air for about 4 hours to insure that all of the soluble sulfates had dissolved. A 10% animal glue solution was then added to the slurry, and a solution of $Sb_2O_3$ containing 0.004% $Sb_2O_3$ based on the weight of the slurry was added in the form of a 10% aqueous $Na_2S$ solution. When flocculation of the insoluble materials was substantially complete the mixture was filtered and a clear liquor having a specific gravity of about 1.48 was obtained. Analysis of this clarified liquor showed that 71.9% of the $TiO_2$ had been recovered.

The clarified titanium sulfate obtained by the above procedure was treated with about 3%, based on the weight of $TiO_2$ in the liquor, of an alkali metal titanate nucleating agent, the liquor having been heated to 50° C. prior to this addition. The mixture was then heated to boiling and maintained at this temperature for about 5 hours. The precipitated hydrolysate was thereafter water washed and was then calcined in the presence of 2.5% of a separately prepared rutile seed for 4 hours at 850° C. The calcined material was then milled and tested. The product had good color, contained over 98% of rutile $TiO_2$, and had a tinting strength of about 1650.

The procedure set forth above was repeated with various other batches of slag and the conditions of the digestion, clarification treatments, and test results were as follows:

| Digestion Number | Weight of Slag | Per Cent $TiO_2$ in Slag | Particle Size of Slag, Microns | Initial Concentration of $H_2SO_4$ | Basicity of Liquor | Glue Addition Based on Weight of Slurry Treated, Per Cent | $Sb_2O_3$ Addition Based on Weight of Slurry Treated, Per Cent | Specific Gravity of Unclarified Liquor | Per Cent Recovery of $TiO_2$ |
|---|---|---|---|---|---|---|---|---|---|
| 1 | 100 lbs | 76.0 | 54.4%—>20<br>75.8%—>10<br>82.7%—> 5 | 98 | 1.4 | 0.032 | 0.0039 | 1.46 | 71.9 |
| 2 | 600 gms | 90.0 | 100%—<44 | 85 | 11.9 | 0.044 | 0.0040 | 1.46 | 76.2 |
| 3 | 100 lbs | 67.1 | 100%—<44<br>90%—>40 | 98 | 20.4 | 0.051 | 0.0062 | 1.5 | 90.0 |
| 4 | 600 gms | 74.2 | 100%—<44 | 90 | 28.2 | 0.067 | 0.0069 | 1.47 | 89.3 |
| 5 | 600 gms | 75.8 | 10.1%—>20<br>52.1%—>10<br>72.1%—> 5 | 92 | 26.3 | 0.046 | 0.0057 | 1.46 | 93.4 |
| 6 | 600 gms | 75.4 | 100%—<44 | 92 | 21.8 | 0.056 | 0.0072 | 1.47 | 85.7 |
| 7 | 600 gms | 75.4 | 100%—<44 | 98 | 14.6 | 0.045 | 0.0051 | 1.48 | 80.0 |

A portion of each hydrolysate was calcined to anatase while the remainder thereof was converted to rutile. In preparing rutile, the $TiO_2$ was produced by mixing about 2½% of a separately prepared rutile seed with the hyrolysate and calcining the mixture for 2.5 to 4 hours at 850° C.–900° C. The calcined material was thereafter milled and tested for tinting strength, color, etc. Test results were as follows:

| | Rutile | | | Anatase | |
|---|---|---|---|---|---|
| $TiO_2$ from Digestion No. | Per Cent Rutile Pigment | Color Value | Tinting Strength | Color Value | Tinting Strength |
| 1 | 98 | 10+B | 1650 vvs Br. | 10+Y | 1330 s B |
| 2 | 92 | 9½ B | 1670 vvs Br. | | |
| 3 | 98 | 9+B | 1650 vs Br. | 10½ Y | 1330 vvs B |
| 4 | 98 | 10+B | 1680 vvs Br. | 10+Y | 1200 vs B |
| 5 | >98 | 9 B | 1540 3 Br. | 10-Br. | 1320 vvs B |
| 6 | >98 | 9½ B | 1520 s Br. | 10½ B | 1250 vvs B |
| 7 | >98 | 9½ B | 1540 vs Br. | 10+Y | 1290 vvs Br. |

An the above tabulation, the color value is based on an arbitrary scale in which the numeral 10 represents the highest degree of brightness ordinarily obtained in commercial titanium dioxide pigment. The letter "B" indicates that the pigment has a slightly bluish tint, the letters "Y" and "Br." indicate respectively that the pigment has a yellowish or brownish tint.

The tinting strength evaluations are based upon an arbitary scale in which present commercial titanium dioxide of anatase crystal structure has a value of about 1250 and commercial rutile titanium dioxide has a value of about 1500. The method of making these evaluations is described in "Physical and Chemical Examination of Paints, Varnishes, Lacquers, and Colors," by H. A. Gardner and G. G. Sward, 10th edition, pages 44 and 45, as the National Lead Company Method. In this table the letters "s," "vs," and "vvs" mean, respectively, slightly, very slightly, and very very slightly.

What we claim is:

1. A method of dissolving titanium dioxide from slag containing at least about 65°% of titanium oxide and from about 1% to about 16% of iron expressed as FeO which comprises comminuting said slag to a particle size distribution such that substantially all thereof is smaller than 70–74 microns in average diameter, and not more than about 8–10% is smaller than 10 microns in average diameter, thereafter mixing said comminuted slag with 85%–98% sulfuric acid, the amount of acid employed being equivalent to about 2.0 parts to about 2.6 parts by weight of 100% $H_2SO_4$ for each part by weight of $TiO_4$ contained in the slag, and then causing the slag and acid to react to solubilize the titanium content of the slag.

2. In a method for the recovery of titanium dioxide from slag containing at least about 65% of titanium oxide, from about 1% to about 16% of iron expressed as FeO, and from about 4–5% to about 25–30% of flux residues wherein the slag is reacted with concentrated sulfuric acid to convert the titanium oxide to water-soluble sulfate form, the method of obtaining a clarified liquor suitable for hydrolysis to produce pure titanium dioxide hydrolysate which comprises preparing a water suspension of the acid-digested material including both the water-soluble constituents thereof and at least a part of the water-insoluble alkaline earth metal sulfates produced from the flux residues, said water suspension having a specific gravity of from about 1.4 to about 1.55, adding to this suspension from about 0.02% to about 0.06% of animal glue and from about 0.005% to about 0.01% of antimony oxide dissolved in a 10% aqueous solution of sodium sulfide, both additions being based on the weight of the aqueous suspension, allowing the mixture to stand until the insoluble material therein has been flocculated, and thereafter filtering the mixture and thereby producing a liquor suitable for hydrolysis.

3. A method as defined by claim 2, and wherein the clarified solution is heated to a boil and boiled until the titanium content therein has precipitated in the form of hydrous titanium dioxide.

4. A method of extracting soluble titanium compounds from titanium-bearing slag which comprises grinding said slag to a particle size distribution such that substantially all is smaller than 70–75 microns in average diameter, at least 92% is not more than about 44 microns in average diameter, and not more than 8–10% is smaller than 10 microns in average diameter, and thereafter digesting said slag with concentrated sulfuric acid to convert substantially all of the $TiO_2$ to water-soluble sulfate condition.

5. In a process for the recovery of titanium dioxide pigment from titanium-bearing slag which has been digested with sulfuric acid to convert the titanium content thereof to water-soluble sulfate form, the method of preparing a clarified liquor suitable for hydrolysis to produce pure titanium dioxide hydrolysate which comprises slurrying the acid-reacted material with sufficient water to obtain an aqueous mixture having a specific gravity of from about 1.4 to about 1.55, adding to this aqueous slurry from about 0.02% to about 0.06% of animal glue and from about 0.005% to about 0.01% of antimony oxide dissolved in a 10% aqueous solution of sodium sulfide, both additions being based on the weight of the slurry, allowing the mixture to stand until the insoluble material therein has flocculated, and thereafter filtering the mixture to obtain a clarified solution.

6. A method of producing titanium dioxide pigment from a slag containing at least about 65% of titanium oxide, from about 1% to about 16% of iron expressed as FeO, and from about 30% to about 5% of flux residues which comprises comminuting said slag to a particle size distribution such that substantially all thereof is smaller than 70–74 microns in average diameter, at least 92% is not more than about 44 microns in average diameter, and not more than about 25–30% is smaller than 10 microns in average diameter, mixing said comminuted slag with 85%–98% sulfuric acid, the amount of acid employed being equivalent to about 1.5 parts to about 2.2 parts by weight of 100% $H_2SO_4$ for each part by weight of $TiO_2$ plus that necessary to react with the other acid-reactive constituents contained in the slag, heating the mixture to initiate reaction between the acid and slag, reacting the acid and slag to solubilize the titanium content of the slag, slurrying the acid-reacted material with sufficient water to obtain an aqueous mixture having a specific gravity of from about 1.4 to about 1.55, adding to this aqueous mixture from about 0.02% to about 0.07% of animal glue and from about 0.004% to about 0.01% of antimony oxide dissolved in a 10% aqueous sodium sulfide solution, both additions being based on the weight of the aqueous slurry, allowing the mixture to stand until the insoluble material therein has been flocculated, filtering the mixture, thereafter heating the clarified solution to a boil and boiling it until the titanium content has precipitated in the form of hydrous titanium dioxide, and then calcining the hydrolysate to obtain a titanium pigment.

7. A method of producing titanium dioxide pigment from a slag containing at least about 65% of titanium oxide, from about 1% to about 16% of iron expressed as FeO, and from about 30% to about 5% of flux residues which comprises comminuting said slag to a particle size distribution such that substantially all thereof is smaller than 70–74 microns in average diameter, at least 92% is not more than about 44 microns in average diameter, and not more than about 8–10% is smaller than 10 microns in average diameter, mixing said comminuted slag with 85%–98% sulfuric acid, the amount of acid employed being equivalent to about 1.5 parts to about 2.2 parts by weight of 100% $H_2SO_4$, for each part by weight of $TiO_2$ plus that necessary to react with the other acid-reactive constituents contained in the slag, heating the mixture to initiate reaction between the acid and slag, reacting the acid and slag to solubilize the titanium content of the slag, slurrying the acid-reacted material with sufficient water to obtain an aqueous mixture having a specific gravity of from about 1.4 to about 1.55, adding to this aqueous mixture from about 0.02% to about 0.07% of animal glue and from about 0.004% to about 0.01% of antimony oxide dissolved in a 10% aqueous sodium sulfide solution, both additions being based on the weight of the aqueous slurry, allowing the mixture to stand until the insoluble material therein has been flocculated, filtering the mixture, thereafter heating the clarified solution to a boil and boiling it until the titanium content has precipitated in the form of hydrous titanium dioxide, and then calcining the hydrolysate to obtain a titanium dioxide pigment.

SELDON P. TODD.
MYRON L. MYERS.
WINFRED J. CAUWENBERG.

REFERENCES CITED

The following references are of record in the file of this patent:

UNITED STATES PATENTS

| Number | Name | Date |
|---|---|---|
| 2,111,788 | Krchma | Mar. 22, 1938 |
| 2,365,135 | Ancrum | Dec. 12, 1944 |
| 2,445,377 | Wyckoff | July 20, 1948 |
| 2,471,242 | Royster | May 24, 1949 |
| 2,476,453 | Pierce et al. | July 19, 1949 |